(12) United States Patent
Gloge (10) Patent No.: US 10,431,236 B2
(45) Date of Patent: Oct. 1, 2019

(54) DYNAMIC PITCH ADJUSTMENT OF INBOUND AUDIO TO IMPROVE SPEECH RECOGNITION

(71) Applicant: Sphero, Inc., Boulder, CO (US)

(72) Inventor: Carly Gloge, Boulder, CO (US)

(73) Assignee: Sphero, Inc., Boulder, CO (US)

( * ) Notice: Subject to any disclaimer, the term of this patent is extended or adjusted under 35 U.S.C. 154(b) by 0 days.

(21) Appl. No.: 15/813,832

(22) Filed: Nov. 15, 2017

(65) Prior Publication Data

US 2018/0137874 A1    May 17, 2018

Related U.S. Application Data

(60) Provisional application No. 62/422,458, filed on Nov. 15, 2016.

(51) Int. Cl.

| | |
|---|---|
| *G10L 21/007* | (2013.01) |
| *G10L 15/22* | (2006.01) |
| *G10L 21/003* | (2013.01) |
| *G10L 25/90* | (2013.01) |
| *G10L 15/26* | (2006.01) |

(52) U.S. Cl.
CPC .......... *G10L 21/007* (2013.01); *G10L 15/22* (2013.01); *G10L 21/003* (2013.01); *G10L 15/26* (2013.01); *G10L 25/90* (2013.01)

(58) Field of Classification Search
CPC ............... G10L 21/003; G10L 21/013; G10L 2021/0135
See application file for complete search history.

(56) References Cited

U.S. PATENT DOCUMENTS

| | | | | | |
|---|---|---|---|---|---|
| 5,054,085 | A | * | 10/1991 | Meisel .................... | G10L 15/02 704/207 |
| 5,226,108 | A | * | 7/1993 | Hardwick ............. | G10L 19/087 704/200 |
| 5,327,521 | A | * | 7/1994 | Savic ...................... | G10L 21/00 704/200 |
| 6,885,986 | B1 | * | 4/2005 | Gigi ........................ | G10L 25/90 704/207 |
| 7,319,959 | B1 | * | 1/2008 | Watts ..................... | G10L 15/02 704/254 |

(Continued)

OTHER PUBLICATIONS

Claes, Tom, et al. "A novel feature transformation for vocal tract length normalization in automatic speech recognition." IEEE Transactions on Speech and Audio Processing 6.6 (1998): 549-557. (Year: 1998).*

(Continued)

*Primary Examiner* — Brian L Albertalli
(74) *Attorney, Agent, or Firm* — Merchant & Gould P.C.

(57) ABSTRACT

Aspects of the present disclosure relate to dynamic pitch adjustment of inbound audio to improve speech recognition. Inbound audio may be received. Upon receiving the inbound audio, clusters of speech input may be detected within the received inbound audio. An average pitch may be detected from the inbound audio, using either subparts of the inbound audio or one or more of the detected speech clusters. A determination may be made using, among other things, the average pitch. Based on this determination, the pitch of the inbound audio may be adjusted. The adjusted input may then be passed to a speech recognition component.

20 Claims, 5 Drawing Sheets

(56) References Cited

U.S. PATENT DOCUMENTS

| | | | |
|---|---|---|---|
| 2007/0198263 A1* | 8/2007 | Chen | G10L 15/065 704/246 |
| 2008/0167862 A1* | 7/2008 | Mohajer | G10L 15/063 704/207 |
| 2010/0191524 A1* | 7/2010 | Washio | G10L 25/78 704/207 |
| 2011/0066426 A1* | 3/2011 | Lee | G10L 15/07 704/207 |
| 2017/0294196 A1* | 10/2017 | Bradley | G10L 15/02 |

OTHER PUBLICATIONS

Potamianos, Alexandros, and Shrikanth Narayanan. "Robust recognition of children's speech." IEEE Transactions on speech and audio processing 11.6 (2003): 603-616. (Year: 2003).*

Gustafson, Joakim, and Kare Sjolander. "Voice transformations for improving children's speech recognition in a publicly available dialogue system." Seventh International Conference on Spoken Language Processing. 2002. (Year: 2002).*

Sinha, Rohit, and Shweta Ghai. "On the use of pitch normalization for improving children's speech recognition." Tenth Annual Conference of the International Speech Communication Association. 2009. (Year: 2009).*

* cited by examiner

DYNAMIC PITCH ADJUSTMENT OF INBOUND AUDIO TO IMPROVE SPEECH RECOGNITION

CROSS-REFERENCE TO RELATED APPLICATIONS

This application claims priority to U.S. Provisional Application No. 62/422,458, titled "Dynamic Pitch Adjustment of Inbound Audio to Improve Speech Recognition," filed on Nov. 15, 2016, the entire disclosure of which is hereby incorporated by reference in its entirety.

BACKGROUND

Speech recognition simplifies human interaction with devices. As a result, a wide variety of devices utilize speech recognition to solicit user input and provide improved accessibility to users. For example, many digital devices have eschewed traditional input mechanisms in favor of speech-based interfaces. However, speech recognition interfaces rely heavily on accurately transcribing spoken input. Certain demographics (e.g., young children) have traditionally presented difficulties for conventional speech recognition techniques, requiring that speech recognition components be specifically adapted to these unique applications.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure relate to dynamic pitch adjustment of inbound audio to improve speech recognition. Inbound audio may be received. Upon receiving the inbound audio, clusters of speech input may be detected within the received inbound audio. An average pitch may be detected from the inbound audio, using either subparts of the inbound audio or one or more of the detected speech clusters. A determination may be made using, among other things, the average pitch. Based on this determination, the pitch of the inbound audio may be adjusted. The adjusted input may then be passed to a speech recognition component.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Speech recognition has customarily required specialization when used with certain demographics (e.g., young children). Examples of the present disclosure relate to dynamically adjusting the pitch of inbound audio to a speech recognition component in order to improve the accuracy of the speech recognition result. In examples, the dynamic pitch adjustment may occur locally on the same device as the speech recognition component. Further examples relate to a system in which the dynamic pitch adjustment occurs on a separate device, distinct from the device operating the speech recognition component. The separate device may be a device that is accessible via a network connection, such as a device that is part of a cloud computing platform. As a result, the systems and methods disclosed herein are operable to dynamically adjust the pitch of inbound audio.

Figure 1:
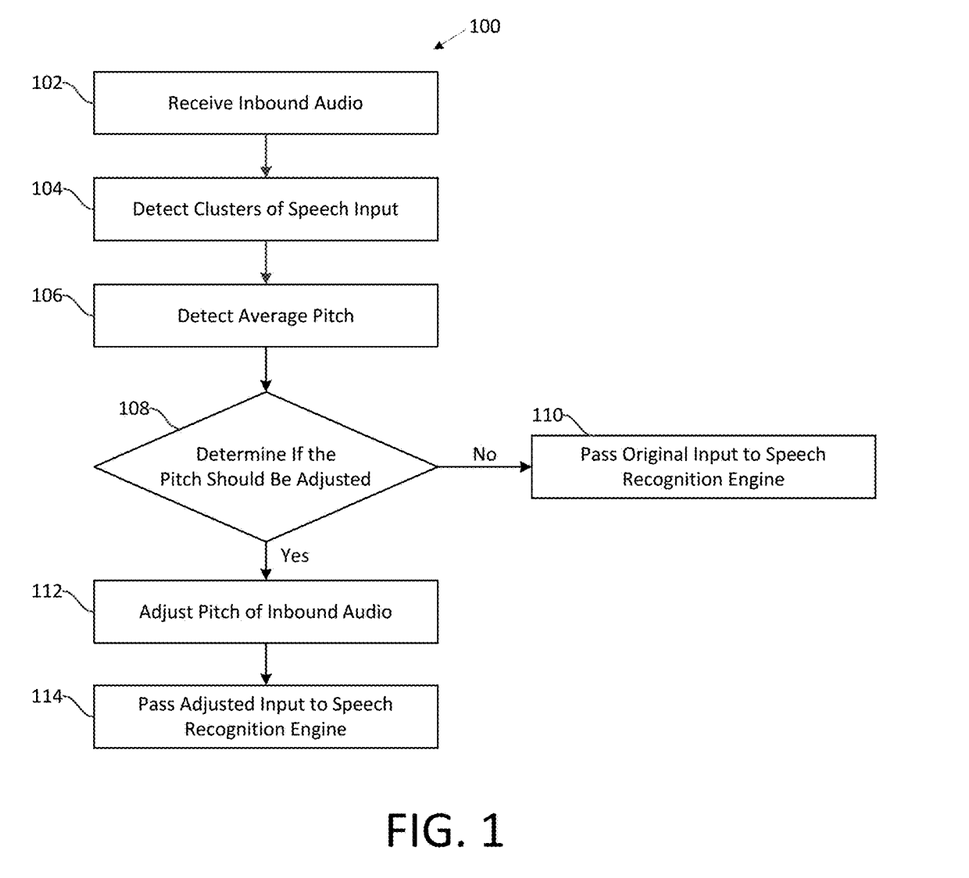
FIG. 1 depicts an example method for dynamically adjusting the pitch of inbound audio.

FIG. 1 illustrates an example method 100 for dynamically adjusting the pitch of inbound audio. In one example, method 100 may be performed by a device, such as a consumer product. Example consumer products include electronic toys, computing devices (e.g., tablets, laptops), smartphones, smartwatches, smart televisions, etc. Alternatively, method 100 may be performed by an intermediary device in electrical communication with a consumer product, or any other type of computing device. Flow begins at operation 102, where inbound audio may be received. In some examples, inbound audio may be received directly from an audio capture device (e.g. a microphone). In another example, the inbound audio may be retrieved from a sound file or received as an audio stream from an audio processing component.

Flow then continues to operation 104, where clusters of speech input may be detected within the received inbound audio. In one example, a speech cluster may comprise one or more spoken words in the received audio. In examples, detecting clusters of speech may comprise detecting a grouping of phonemes in the received audio. The example method 200 discussed below with respect to FIG. 2 may provide additional details regarding speech cluster detection.

Moving to operation 106, the average pitch of the inbound audio may be determined. In one example, determining the average pitch may include determining a median pitch based upon one or more detected speech clusters. In another example, the mean pitch of one or more speech clusters may be used to determine an average pitch for the one or more speech clusters. In some examples, the average may be determined by analyzing some or all of the inbound audio distinct from or in addition to the speech clusters.

Figure 3:
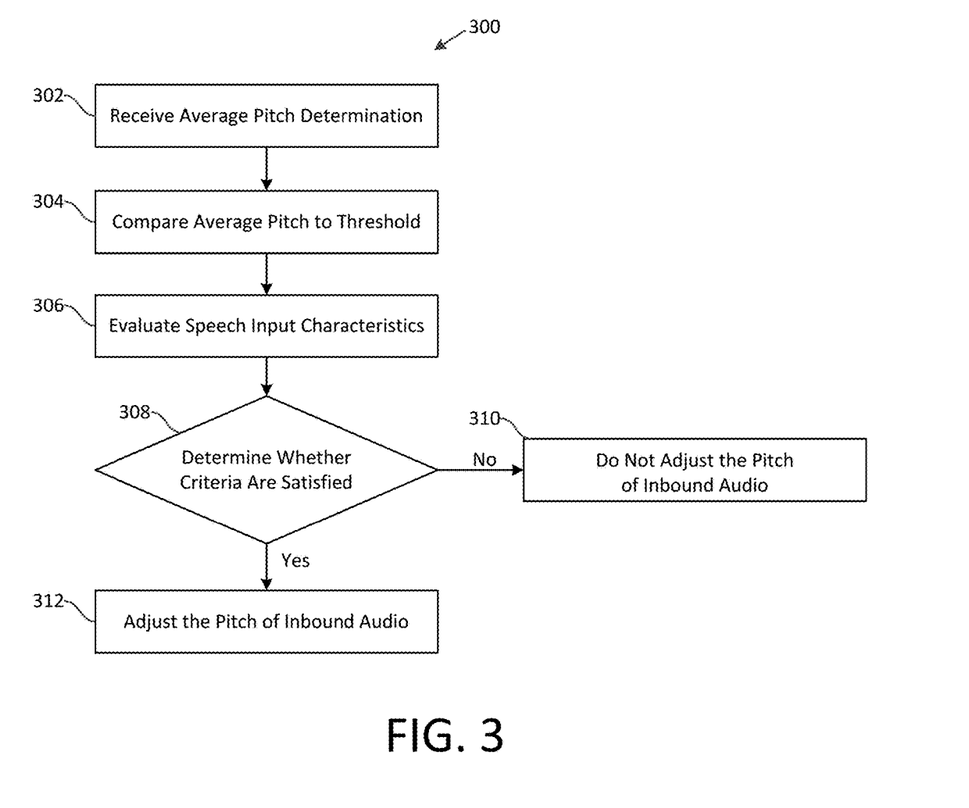
FIG. 3 depicts an example method for determining whether the pitch of inbound audio should be adjusted.

At decision operation 108, a determination may be made whether the pitch of the inbound audio should be adjusted. In an example, the determination may be made based upon whether the average pitch detected at operation 106 is within a specific range. For example, a determination may be made that the pitch should be adjusted if the average pitch is greater than or equal to 160 hertz. In another example, the threshold may be 250 hertz and above. While specific threshold values have been disclosed herein, one of skill in the art will appreciate that different threshold may be employed by the systems and methods disclosed herein without departing from the spirit of this disclosure. In other examples, the expected content of the speech input may be used to determine whether the pitch should be adjusted. As an example, if the content of the speech input is expected to contain a phoneme which is generally pronounced at a higher pitch in relation to its surrounding phonemes (e.g., such as the "s" in the word "yes"), the determination may be adjusted accordingly such that the presence of the higher-pitched phoneme does not disproportionately skew the determination for the speech input as a whole. In some examples, the phoneme or associated word may be excluded from the determination. FIG. 3 and its accompanying discussion may provide additional details regarding the determination of whether the pitch of the inbound audio should be adjusted. If it is determined that the pitch should not be adjusted, flow terminates at operation 110, where the original input may be passed to a speech recognition engine.

If, however, it is determined at decision operation 108 that the pitch should be adjusted, flow continues to operation 112 where the pitch of the inbound audio may be adjusted. In an example, the pitch of the entire segment of inbound audio may be adjusted. In other examples, the pitch of one or more portions of the inbound audio (e.g., select speech clusters) may be adjusted. In another example, the pitch may be adjusted such that the average pitch of the resulting audio segment matches a specific target value. In some examples, the specific target value may be determined by increasing or decreasing the determined average by a certain amount (e.g., 400 cents). At operation 114, the adjusted input may be passed to a speech recognition engine, after which the flow terminates.

Figure 2:
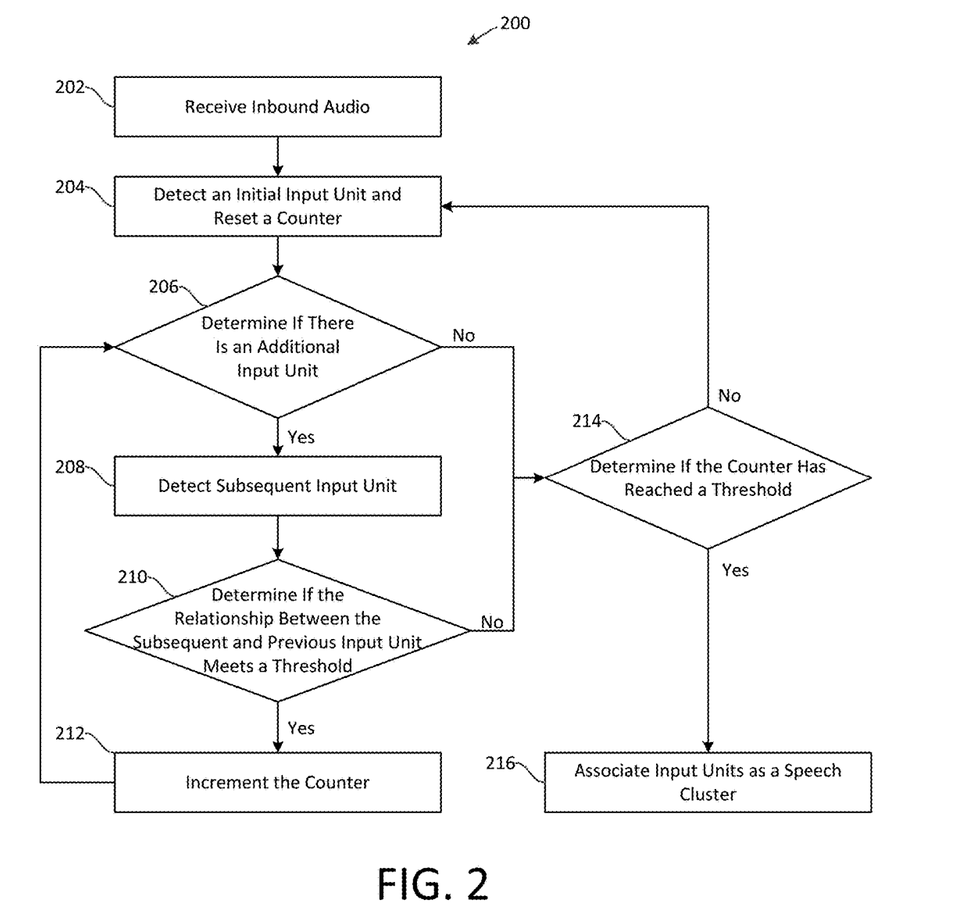
FIG. 2 depicts an example method for detecting speech clusters within a segment of inbound audio.

FIG. 2 depicts an example method 200 for detecting speech clusters within a segment of inbound audio. In one example, method 200 may be performed by a device, such as a consumer product. In another example, method 200 may be performed by an intermediary device in electrical communication with a consumer product, or any other type of computing device. Flow begins at operation 202, where inbound audio may be received. In some examples, inbound audio may be received directly from an audio capture device (e.g. a microphone). In another example, the inbound audio may be retrieved from a sound file or received as an audio stream from an audio processing component.

Flow then continues to operation 204, where an initial input unit may be detected and a counter may be reset. The input unit may comprise a subpart of the received inbound audio. In some examples, an input unit may be defined as an audio segment which has a specific duration (e.g. 2 milliseconds). At decision operation 206, a determination may be made whether there is an additional input unit. In some examples, the additional input unit may be the next available segment of an audio stream. In another example, the additional input unit may be a segment of a stored audio file. If there is not an additional input unit available, flow progresses to decision operation 214, where the counter may be compared to a threshold value. If the counter has reached the threshold value, flow progresses to operation 216, where the input units that have been detected (by operations 204 and 208) may be associated as a speech cluster. If, however, the counter has not reached the threshold, flow returns to operation 204 where the counter may be reset and input unit detection may start anew.

Returning to decision operation 206, if there is an additional input unit, flow continues to operation 208, where a subsequent input unit may be detected. Flow then progresses to decision operation 210, where the relationship between the initial input unit and the subsequent input unit may be analyzed to determine whether a threshold is met. In an example, the determination may comprise comparing the pitch of the initial and subsequent input units to determine whether the difference in pitch is below a threshold (e.g. 2 hertz). In another example, the determination may comprise evaluating the input units to determine whether the frequencies present in the initial input unit remained present in the subsequent input unit. If the threshold requirement is not satisfied, flow branches No to decision operation 214, where the counter may be compared to a threshold value. If the counter has reached the threshold value, flow branches Yes to operation 216, where the input units detected by operations 204 and 208 may be associated as a speech cluster. If, however, the counter has not reached the threshold, flow instead returns to operation 204, where the counter may be reset and input unit detection may start anew.

Returning to decision operation 210, if the threshold requirement is satisfied, flow continues to operation 212, where the counter is incremented. Flow then returns to operation 206, where it may again be determined whether another input unit is available. If an additional input unit is available, flow branches Yes to operation 208, where a new input unit may be detected. At decision operation 210, the newly-detected input unit may be compared to the input unit detected during the previous execution of operation 208 (previously referred to above as the "subsequent input unit"). Flow may loop through operations 206, 208, 210, and 212 until there are no additional input units available (thereby failing decision operation 206) or until a later-received input unit may fail to satisfy the threshold determination at decision operation 210.

Upon exiting the loop via either decision operation 210 or decision operation 206, flow continues to decision operation 214, where the counter may be compared to a threshold value. If the counter has reached the threshold value, flow progresses to operation 216, where the input units detected by operations 204 and 208 may be associated as a speech cluster. If, however, the counter has not reached the threshold, flow returns to operation 204, where the counter may be reset and input unit detection may start anew.

FIG. 3 illustrates an example method 300 for determining whether the pitch of inbound audio should be adjusted. In one example, method 300 may be performed by a device, such as a consumer product. Alternatively, method 300 may be performed by an intermediary device in electrical communication with a consumer product, or any other type of computing device. Flow begins at operation 302, where an average pitch determination may be received. The average pitch determination may have been detected by determining the median pitch of one or more speech input clusters. In another example, the mean pitch of one or more speech input clusters may be used to determine the average. In some examples, the average may be determined by analyzing some or all of an inbound audio distinct from or in addition to the speech clusters.

At operation 304, the average pitch may be compared to a threshold. In one example, the threshold may be a range of values. In another example, the threshold may be a value that is indicative of a pitch ceiling or a pitch floor (e.g. in order to satisfy the threshold, the average pitch must be below 160 hertz, etc.). Continuing to operation 306, the characteristics of the speech input may be evaluated. In some examples, these characteristics may include the expected content of the speech input and the duration of the speech input.

At decision operation 308, the results of the comparison in operation 304 and the evaluation in operation 306 may be used to determine whether criteria have been satisfied. In an example, the pitch comparison may be the sole basis for the determination criteria. In another example, the speech input characteristics may be the sole basis for the determination criteria (e.g. when expecting that the speech input will contain a phoneme that is generally spoken with a pitch that generally would, if using only the pitch-based determination, result in the erroneous determination to adjust the pitch of the inbound audio). In other examples, the results of both the pitch comparison and speech input characteristic evaluation may be used together to determine whether the pitch of the inbound audio should be adjusted. If the criteria are not satisfied, flow terminates at operation 310, where the pitch of the inbound audio may not be adjusted.

If, however, the criteria are satisfied, flow instead terminates at operation 312 where the pitch of the inbound audio may be adjusted. In an example, the entire segment of inbound audio may be adjusted. In other examples, the pitch of one or more portions of the inbound audio (e.g., select speech clusters) may be adjusted. In another example, the pitch may be adjusted such that the average pitch of the resulting audio segment matches a specific target value. In some examples, the specific target value may be determined by increasing or decreasing the determined average by a certain amount (e.g., 400 cents). After operation 312, flow terminates.

Figure 4:
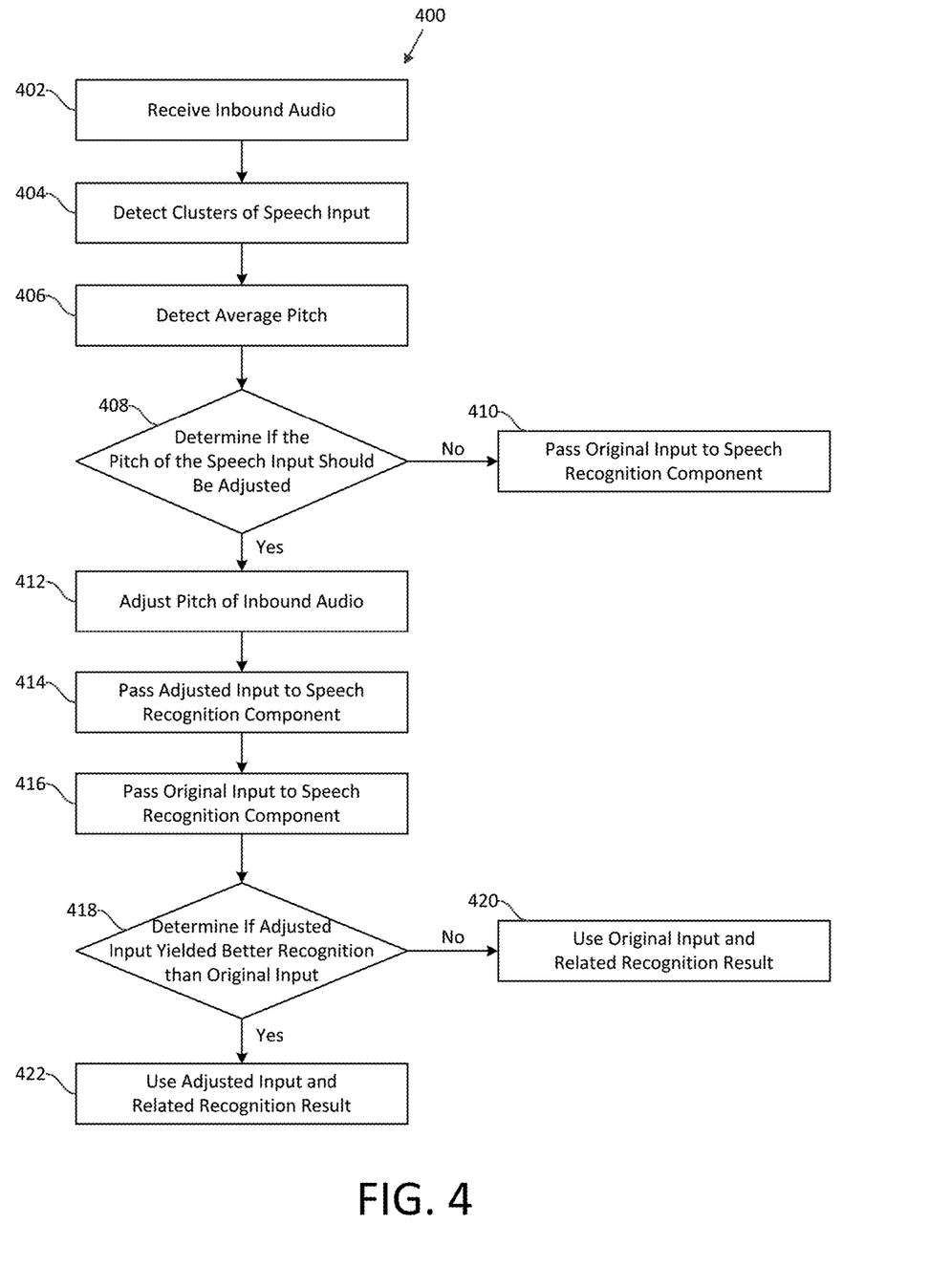
FIG. 4 depicts an example method for dynamically adjusting the pitch of inbound audio.

FIG. 4 depicts an example method 400 for dynamically adjusting the pitch of inbound audio. In one example, method 400 may be performed by a device, such as a consumer product. Alternatively, method 400 may be performed by an intermediary device in electrical communication with a consumer product, or any other type of computing device. Flow begins at operation 402 where inbound audio may be received. In some examples, inbound audio may be received directly from an audio capture device (e.g. a microphone). In another example, the inbound audio may be retrieved from a sound file or received as an audio stream from an audio processing component.

Flow then continues to operation 404, where clusters of speech input may be detected within the received inbound audio. In some examples, speech cluster detection may be achieved by executing the operations described by method 200, as depicted in FIG. 2. At operation 406, the average pitch of the inbound audio may be detected. In one example, the average pitch may be detected by determining the median pitch of one or more speech input clusters. In another example, the mean pitch of one or more speech input clusters may be used to determine the average. In some examples, the average may be determined by analyzing some or all of the inbound audio distinct from or in addition to the speech clusters.

At decision operation 408, a determination may be made whether the pitch of the speech input should be adjusted. In some examples, the determination may be made by executing the operations described by method 300, as depicted in FIG. 3. In an example, the determination may be made based on whether the average pitch detected in operation 406 is within a specific range. For example, it may be determined that the pitch should be adjusted if the average pitch is greater than or equal to 160 hertz. In an example, the threshold value may be 250 hertz or greater. In other examples, the expected content of the speech input may be used to determine whether the pitch should be adjusted. If it is determined that the pitch should not be adjusted, flow terminates at operation 410, where the original input is passed to a speech recognition component. If, however, it is determined that the pitch should be adjusted, flow continues to operation 412. In some examples, flow may pass from operation 406 to operation 412, thereby omitting decision operation 408 and operation 410.

At operation 412, the pitch of the inbound audio may be adjusted. In an example, the entire segment of inbound audio may be adjusted. In other examples, the pitch of one or more portions of the inbound audio (e.g., select speech clusters) may be adjusted. In another example, the pitch may be adjusted such that the average pitch of the resulting audio segment matches a specific target value. In some examples, the specific target value may be determined by increasing or decreasing the determined average by a certain amount (e.g., 400 cents). Flow then moves to operation 414, where the adjusted inbound audio may be provided to a speech recognition component. At operation 416, the original input is provided to a speech recognition component.

At decision operation 418, the speech recognition results produced by operations 414 and 416 may be compared to determine if the adjusted inbound audio yielded a better speech recognition result than the original inbound audio. In an example, this comparison may be made by comparing the recognition results to an expected response (e.g., if the user was prompted for a response to a "yes" or "no" question, the more favorable result would be that which recognized either an affirmative or negative response). In another example, the speech recognition results may undergo textual analysis to determine which recognition result is more intelligible. This determination may evaluate various factors, including whether the result is grammatically correct, makes logical and contextual sense, and is internally consistent. If, at decision operation 418, it is determined that the adjusted input yielded a better speech recognition result, flow terminates at operation 422, where the adjusted input and related recognition result are used. By contrast, if decision operation 418 determines that the original input yielded a more favorable speech recognition result, flow terminates at operation 420, where the original input and related recognition result are used. Alternatively, in some examples the speech recognition results generated using both the original input and the adjusted input may be used to produce a combined recognition result. In such examples, the results derived from both types of inputs may be provided as parameters to a process, for example, that employs as a natural language understanding model, to derive an entirely new result.

Figure 5:
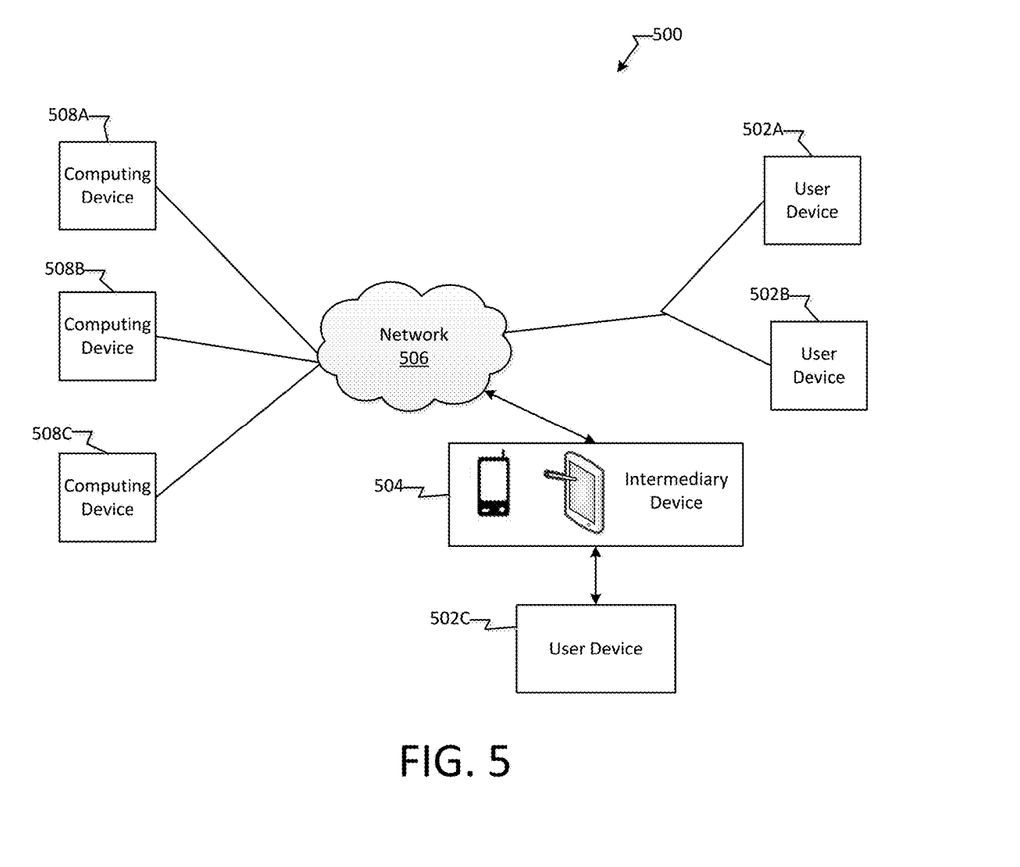
FIG. 5 illustrates an example system for dynamically adjusting the pitch of inbound audio.

FIG. 5 illustrates an exemplary system 500 operable to dynamically adjust the pitch of inbound audio. The system 500 may provide the various factors discussed in this disclosure individually or in combination in order to dynamically adjust the pitch of inbound audio.

System 500 includes user device 502A-C and computing device 508A-C. In some examples, these devices may be general computing devices, mobile devices, or specialized server devices. Computing device 508A-C may be made accessible to user device 502A-C by a communications connection such as network 506. Further, user device 502C may connect to network 506 through intermediary device 504. In some examples, user device 502C may be a specialized device with reduced computing capacity or resources. As a result, user device 502C may rely on intermediary device 504 to provide additional computing capacity or resources. Exemplary intermediary devices include, but are not limited to, a smartphone, a smart watch, a wearable device, a virtual reality headset, an augmented reality headset, a laptop or tablet computing device, another consumer product, and the like. Computing device 508A-C may comprise a cloud computing system that makes services available (e.g. computing and storage services) to client devices (e.g. user device 502A-C) via network 506.

In one example, user device 502A-C may provide a speech recognition interface to a user. As a result, user device 502A-C may include a dynamic pitch adjustment component and a speech recognition component so that speech input may be processed locally on the device. In another example, user device 502C may omit any speech processing components and may instead utilize a dynamic pitch adjustment component and a speech recognition component provided by intermediary device 504. In another example, user device 502A-C may include either the dynamic pitch adjustment component or the speech recognition component, while relying either on intermediary device 504 or computing device 508A-C to provide the other speech processing component.

Upon receiving audio input, user device 502A-C may provide the inbound audio to the dynamic pitch adjustment component. As discussed above, this component may local to user device 502A-C, available remotely on intermediary device 504, or provided as a service on computing device 508A-C. In an example, the dynamic pitch adjustment component may execute the operations set forth in method 100, described in FIG. 1. Upon receiving the inbound audio, the dynamic pitch adjustment component may detect clusters of speech input. Speech cluster detection may be achieved by executing the operations described by method 200, as depicted in FIG. 2. An average pitch for the inbound audio may also be detected. In one example, the average pitch may be detected by determining the median pitch of one or more speech input clusters. In another example, the mean pitch of one or more speech input clusters may be used to determine the average. In some examples, the average may be determined by analyzing some or all of the inbound audio distinct from or in addition to the speech clusters.

The dynamic pitch adjustment component may then determine whether the pitch should be adjusted. This determination may be made by executing the operations described by method 300, as depicted in FIG. 3. In an example, the determination may be made based on whether the average pitch detected for the inbound audio is within a specific range, or above or below a specific threshold. In other examples, the expected content of the speech input may be used to determine whether the pitch should be adjusted. The dynamic pitch adjustment component may then provide to the speech recognition component either the adjusted audio (if it was determined the pitch should be adjusted) or the original audio.

In some examples, the dynamic pitch adjustment component may provide both the adjusted audio and original audio to the speech recognition component. The speech recognition component may then provide the recognition results to the dynamic pitch adjustment component, where the two results may be compared to determine whether the pitch adjustment yielded a more intelligible transcription. This determination may evaluate various factors, including whether the result is grammatically correct, makes logical and contextual sense, and is internally consistent.

If both speech processing components are not present on the same device (e.g. speech processing is split across user device 502A-C and computing device 508A-C), then audio input, transcription results, and associated intermediary data may be transmitted across network 506 or any other communication connection. Exemplary communications connections include radio frequency (RF) transmitter, receiver, and/or transceiver circuitry, infrared transmitters, universal serial bus (USB), parallel, and/or serial ports. Communications connections may be operable to communicate with other devices via a number of different communications protocols, such as, Wi-Fi, Bluetooth, Ethernet, BLE, IMU, etc. While specific devices in system 500 have been described as performing specific operations, one of skill in the art will appreciate that the operations disclosed herein may be performed by any of the exemplary devices depicted in system 500. Furthermore, the methods disclosed herein may be executed using a single device or executed using multiple devices, each of which may perform a subset of the operations disclosed herein.

As will be understood from the foregoing disclosure, one aspect of the technology relates to a system for dynamically adjusting the pitch of inbound audio, comprising: at least one processor; and memory encoding computer executable instructions that, when executed by the at least one processor, perform a method. The method comprises: receiving an input audio segment; detecting one or more clusters of speech input within the input audio segment; detecting an average pitch for at least one of the one or more clusters of speech input; determining, based on at least the average pitch, whether the pitch of the input audio segment should be adjusted; based on determining that the pitch should be adjusted, adjusting the pitch of at least one of the one or more speech clusters to generate an adjusted audio segment; and transmitting the adjusted audio segment to a speech recognition component. In an example, detecting one or more clusters of speech input comprises: detecting an initial input unit and a subsequent input unit for the input audio segment; comparing the initial input unit and the subsequent input unit using a threshold to determine whether a relationship between the initial input unit and the subsequent input unit meets the threshold; and when it is determined that the relationship meets the threshold, associating the initial input unit and the subsequent input unit as a speech cluster of the one or more clusters of speech input. In another example, determining whether the pitch of the input audio segment should be adjusted comprises evaluating at least one of: an expected content for the input audio segment; and a duration of the input audio segment. In a further example, the method further comprises: transmitting the input audio segment to the speech recognition component; generating an original recognition result using the input audio segment; generating an adjusted recognition result using the adjusted audio segment; determining whether the adjusted recognition result is more accurate than the original recognition result; and when it is determined that the adjusted recognition result is more accurate, using the adjusted recognition result. In yet another example, determining whether the pitch of the input audio segment should be adjusted comprises analyzing at least one of the one or more clusters of speech input within the input audio segment. In a further still example, the input audio segment is received from an audio capture device. In another example, the input audio segment is received from an audio processing component.

In another aspect, the technology relates to a system for dynamically adjusting the pitch of inbound audio, comprising: at least one processor; and memory encoding computer executable instructions that, when executed by the at least one processor, perform a method. The method comprises: receiving an input audio segment, wherein the input audio segment is comprised of one or more clusters of speech input; detecting an average pitch for at least one of the one or more clusters of speech input; determining, based on at least the average pitch, whether the pitch of at least a part of the input audio segment should be adjusted; and based on determining that the pitch should be adjusted, adjusting the pitch of at least one of the one or more speech clusters to generate an adjusted audio segment. In an example, determining whether the pitch of the input audio segment should be adjusted comprises evaluating at least one of: an expected content for the input audio segment; and a duration of the input audio segment. In another example, the method further comprises: transmitting the adjusted audio segment to a speech recognition component; transmitting the input audio segment to the speech recognition component; generating an original recognition result using the input audio segment; generating an adjusted recognition result using the adjusted audio segment; determining whether the adjusted recognition result is more accurate than the original recognition result; and when it is determined that the adjusted recognition result is more accurate, using the adjusted recognition result. In a further example, determining whether the pitch of the input audio segment should be adjusted comprises analyzing at least one of the one or more clusters of speech input within the input audio segment. In yet another example, the input audio segment is received from an audio capture device. In a further still example, the input audio segment is received from an audio processing component.

In a further aspect, the technology relates to a computer-implemented method for dynamically adjusting the pitch of inbound audio. The method comprises: receiving an input audio segment; detecting one or more clusters of speech input within the input audio segment; detecting an average pitch for at least one of the one or more clusters of speech input; determining, based on at least the average pitch, whether the pitch of the input audio segment should be adjusted; based on determining that the pitch should be adjusted, adjusting the pitch of at least one of the one or more speech clusters to generate an adjusted audio segment; and transmitting the adjusted audio segment to a speech recognition component. In an example, detecting one or more clusters of speech input comprises: detecting an initial input unit and a subsequent input unit for the input audio segment; comparing the initial input unit and the subsequent input unit using a threshold to determine whether a relationship between the initial input unit and the subsequent input unit meets the threshold; and when it is determined that the relationship meets the threshold, associating the initial input unit and the subsequent input unit as a speech cluster of the one or more clusters of speech input. In another example, determining whether the pitch of the input audio segment should be adjusted comprises evaluating at least one of: an expected content for the input audio segment; and a duration of the input audio segment. In a further example, the method further comprises: transmitting the input audio segment to the speech recognition component; generating an original recognition result using the input audio segment; generating an adjusted recognition result using the adjusted audio segment; determining whether the adjusted recognition result is more accurate than the original recognition result; and when it is determined that the adjusted recognition result is more accurate, using the adjusted recognition result. In yet another example, determining whether the pitch of the input audio segment should be adjusted comprises analyzing at least one of the one or more clusters of speech input within the input audio segment. In a further still example, the input audio segment is received from an audio capture device. In another example, the input audio segment is received from an audio processing component.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system for dynamically adjusting the pitch of inbound audio, comprising:
   at least one processor; and
   memory encoding computer executable instructions that, when executed by the at least one processor, perform a method comprising:
   receiving an input audio segment;
   detecting one or more clusters of speech input within the input audio segment;
   detecting an average pitch for at least one of the one or more clusters of speech input;
   determining, based on at least the average pitch and an expected content for the input audio segment, whether the pitch of the input audio segment should be adjusted;
   based on determining that the pitch should be adjusted, adjusting the pitch of at least one of the one or more speech clusters to generate an adjusted audio segment; and
   transmitting the adjusted audio segment to a speech recognition component.

2. The system of claim 1, wherein detecting one or more clusters of speech input comprises:
   detecting an initial input unit and a subsequent input unit for the input audio segment;
   comparing the initial input unit and the subsequent input unit using a threshold to determine whether a relationship between the initial input unit and the subsequent input unit meets the threshold; and
   when it is determined that the relationship meets the threshold, associating the initial input unit and the subsequent input unit as a speech cluster of the one or more clusters of speech input.

3. The system of claim 1, wherein determining whether the pitch of the input audio segment should be adjusted further comprises evaluating a duration of the input audio segment.

4. The system of claim 1, wherein the method further comprises:
   transmitting the input audio segment to the speech recognition component;
   generating an original recognition result using the input audio segment;

generating an adjusted recognition result using the adjusted audio segment;

determining whether the adjusted recognition result is more accurate than the original recognition result; and when it is determined that the adjusted recognition result is more accurate, using the adjusted recognition result.

5. The system of claim 1, wherein determining whether the pitch of the input audio segment should be adjusted comprises analyzing at least one of the one or more clusters of speech input within the input audio segment.

6. The system of claim 1, wherein the input audio segment is received from an audio capture device.

7. The system of claim 1, wherein the input audio segment is received from an audio processing component.

8. A system for dynamically adjusting the pitch of inbound audio, comprising:

at least one processor; and memory encoding computer executable instructions that, when executed by the at least one processor, perform a method comprising:

receiving an input audio segment, wherein the input audio segment is comprised of one or more clusters of speech input;

detecting an average pitch for at least one of the one or more clusters of speech input;

determining, based on at least the average pitch and an expected content for the input audio segment, whether the pitch of at least a part of the input audio segment should be adjusted; and based on determining that the pitch should be adjusted, adjusting the pitch of at least one of the one or more speech clusters to generate an adjusted audio segment.

9. The system of claim 8, wherein determining whether the pitch of the input audio segment should be adjusted further comprises evaluating a duration of the input audio segment.

10. The system of claim 8, wherein the method further comprises:

transmitting the adjusted audio segment to a speech recognition component;

transmitting the input audio segment to the speech recognition component;

generating an original recognition result using the input audio segment;

generating an adjusted recognition result using the adjusted audio segment;

determining whether the adjusted recognition result is more accurate than the original recognition result; and when it is determined that the adjusted recognition result is more accurate, using the adjusted recognition result.

11. The system of claim 8, wherein determining whether the pitch of the input audio segment should be adjusted comprises analyzing at least one of the one or more clusters of speech input within the input audio segment.

12. The system of claim 8, wherein the input audio segment is received from an audio capture device.

13. The system of claim 8, wherein the input audio segment is received from an audio processing component.

14. A computer-implemented method for dynamically adjusting the pitch of inbound audio, comprising:

receiving an input audio segment;

detecting one or more clusters of speech input within the input audio segment;

detecting an average pitch for at least one of the one or more clusters of speech input;

determining, based on at least the average pitch and an expected content for the input audio segment, whether the pitch of the input audio segment should be adjusted;

based on determining that the pitch should be adjusted, adjusting the pitch of at least one of the one or more speech clusters to generate an adjusted audio segment; and transmitting the adjusted audio segment to a speech recognition component.

15. The computer-implemented method of claim 14, wherein detecting one or more clusters of speech input comprises:

detecting an initial input unit and a subsequent input unit for the input audio segment;

comparing the initial input unit and the subsequent input unit using a threshold to determine whether a relationship between the initial input unit and the subsequent input unit meets the threshold; and when it is determined that the relationship meets the threshold, associating the initial input unit and the subsequent input unit as a speech cluster of the one or more clusters of speech input.

16. The computer-implemented method of claim 14, wherein determining whether the pitch of the input audio segment should be adjusted further comprises evaluating a duration of the input audio segment.

17. The computer-implemented method of claim 14, further comprising:

transmitting the input audio segment to the speech recognition component;

generating an original recognition result using the input audio segment;

generating an adjusted recognition result using the adjusted audio segment;

determining whether the adjusted recognition result is more accurate than the original recognition result; and when it is determined that the adjusted recognition result is more accurate, using the adjusted recognition result.

18. The computer-implemented method of claim 14, wherein determining whether the pitch of the input audio segment should be adjusted comprises analyzing at least one of the one or more clusters of speech input within the input audio segment.

19. The computer-implemented method of claim 14, wherein the input audio segment is received from an audio capture device.

20. The computer-implemented method of claim 14, wherein the input audio segment is received from an audio processing component.

* * * * *